(12) United States Patent
Askan

(10) Patent No.: US 11,502,641 B2
(45) Date of Patent: Nov. 15, 2022

(54) PHOTOVOLTAIC STRING COMBINER BOX WITH PROTECTION FUNCTIONS

(71) Applicant: Eaton Intelligent Power Limited, Dublin (IE)

(72) Inventor: Kenan Askan, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/292,458

(22) PCT Filed: Nov. 4, 2019

(86) PCT No.: PCT/EP2019/080024
§ 371 (c)(1),
(2) Date: May 10, 2021

(87) PCT Pub. No.: WO2020/099157
PCT Pub. Date: May 22, 2020

(65) Prior Publication Data
US 2022/0021335 A1    Jan. 20, 2022

(30) Foreign Application Priority Data
Nov. 12, 2018 (GB) .................................. 1818408

(51) Int. Cl.
*H02S 40/34* (2014.01)
*H02H 7/20* (2006.01)
(Continued)

(52) U.S. Cl.
CPC ............. *H02S 40/34* (2014.12); *H02H 7/20* (2013.01); *H02H 11/00* (2013.01); *H02S 50/00* (2013.01); *Y02E 10/50* (2013.01)

(58) Field of Classification Search
CPC ......... Y02E 10/50; H02S 50/00; H02S 40/34; H02S 40/36; H02J 2300/24; H02J 3/381; H02J 3/383; Y04S 10/123; Y10S 323/906
See application file for complete search history.

(56) References Cited

U.S. PATENT DOCUMENTS 6,593,520 B2 * 7/2003 Kondo .................... H02S 50/10
136/291
8,933,321 B2 * 1/2015 Hadar .................... H02S 40/34
136/246
(Continued)

FOREIGN PATENT DOCUMENTS

DE   102011056577 B3   5/2013
DE   102016100758 A1   7/2017
(Continued)

*Primary Examiner* — Ryan Johnson
(74) *Attorney, Agent, or Firm* — Leydig, Voit & Mayer, Ltd.

(57) ABSTRACT

A photovoltaic string combiner box with protection functions includes: a plurality of input connections for connecting a plurality of photovoltaic strings to the combiner box, the plurality of input connections respectively including a first input terminal and a second input terminal; an output connection for connecting an inverter to the combiner box; a plurality of current lines, a respective one of the current lines being connected to a respective one of the input connections; a plurality of controllable switches being connected to the plurality of input connections for short-circuiting a respective one of the first and second input terminals; a plurality of disconnectors; a common current line connected to the output connection and having an input node connected to each of the plurality of current lines by a respective one of the disconnectors; and a controllable network arranged in the common current line between the output connection and input node.

16 Claims, 2 Drawing Sheets

(51) Int. Cl.
*H02H 11/00* (2006.01)
*H02S 50/00* (2014.01)

(56) References Cited

U.S. PATENT DOCUMENTS

| | | |
|---|---|---|
| 9,543,088 B2 | 1/2017 | Hopf et al. |
| 10,541,646 B2 | 1/2020 | Hopf |
| 2014/0292085 A1 | 10/2014 | Galin et al. |
| 2015/0280423 A1 | 10/2015 | Bremicker et al. |
| 2016/0036235 A1 | 2/2016 | Getsla |

FOREIGN PATENT DOCUMENTS

| | | |
|---|---|---|
| EP | 2393178 A2 | 12/2011 |
| JP | 2001085716 A | 3/2001 |
| KR | 101911066 B1 | 10/2018 |
| WO | WO 2010078303 A2 | 7/2010 |

\* cited by examiner

PHOTOVOLTAIC STRING COMBINER BOX WITH PROTECTION FUNCTIONS

CROSS-REFERENCE TO PRIOR APPLICATIONS

This application is a U.S. National Phase application under 35 U.S.C. § 371 of International Application No. PCT/EP2019/080024, filed on Nov. 4, 2019, and claims benefit to British Patent Application No. GB 1818408.5, filed on Nov. 12, 2018. The International Application was published in English on May 22, 2020 as WO 2020/099157 under PCT Article 21(2).

FIELD

The invention relates to a smart PV (photovoltaic) string combiner box with protection functions, for example electric contactor functions, overvoltage protection functions as well as monitoring functions.

BACKGROUND

A PV string combiner box is used to bring the output of several solar strings together. The respective current from each PV string is combined onto a single common current line that connects the box to an inverter. In several situations, such as maintenance of a PV string, a safe disconnection of the respective PV string from the combiner box is required. During re-connection of the respective PV string, it has to be ensured that internal components of the combiner box, such as disconnectors, are not damaged.

During isolation of a PV string from the combiner box and during the re-connection of the isolated PV string with the combiner box, it has to be ascertained that an undesired current flow is avoided which could lead to an arc generation at contacts of internal disconnectors of the combiner box. Furthermore, the occurrence of overcurrent or overvoltages inside the combiner box has to be avoided.

In a conventional PV array, a plurality of PV strings including a respective number of series connected PV modules are connected in parallel. Each PV string is protected in the case of a short-circuit of the whole string by at least one respective fuse. However, if a short-circuit affects only one module in a PV string or a low number of modules in the PV string, the current flowing through the respective string may be too low to activate the at least one fuse. As a consequence, the modules in the respective PV string may be damaged.

SUMMARY

In an embodiment, the present invention provides a photovoltaic string combiner box with protection functions, comprising: a plurality of input connections configured to connect a plurality of photovoltaic strings to the combiner box, the plurality of input connections respectively comprising a first input terminal and a second input terminal; an output connection configured to connect an inverter to the combiner box; a plurality of current lines, a respective one of the current lines being connected to a respective one of the input connections; a plurality of controllable switches being connected to the plurality of input connections to short-circuit a respective one of the first and second input terminals; a plurality of disconnectors; a common current line connected to the output connection and having an input node connected to each of the plurality of current lines by a respective one of the disconnectors; and a controllable network arranged in the common current line between the output connection and the input node, the controllable network being configured to provide a blocking of a current flowing from the output connection to the plurality of disconnectors.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a photovoltaic string combiner box with protection functions to protect and safely isolate each PV string of a PV array from the combiner box and to provide monitoring of voltages and currents provided by the various PV strings connected to the box.

The PV string combiner box with protection functions described herein is configured to protect and safely isolate each PV string of a PV array with power electronics assisted switching and utilization of AC circuit breaker or AC relays without electrical arc and interruption of strings in the same PV box and neighbouring PV string boxes/arrays. The PV string combiner box is configured to provide a current and voltage monitoring by current and voltage measurement of each single PV string so that performance of each PV string can be monitored.

Moreover, a shaded string in a PV array can be disconnected and isolated from the array to avoid a reverse current which may flow into the PV string and destroy the module or the cells of the string. The described PV string combiner box enables a string or blocking diode to be eliminated. Abnormal conditions of a PV string or array can be determined and a faulty string can be isolated from the array, avoiding a shut-down of the complete PV system.

Figure 1:
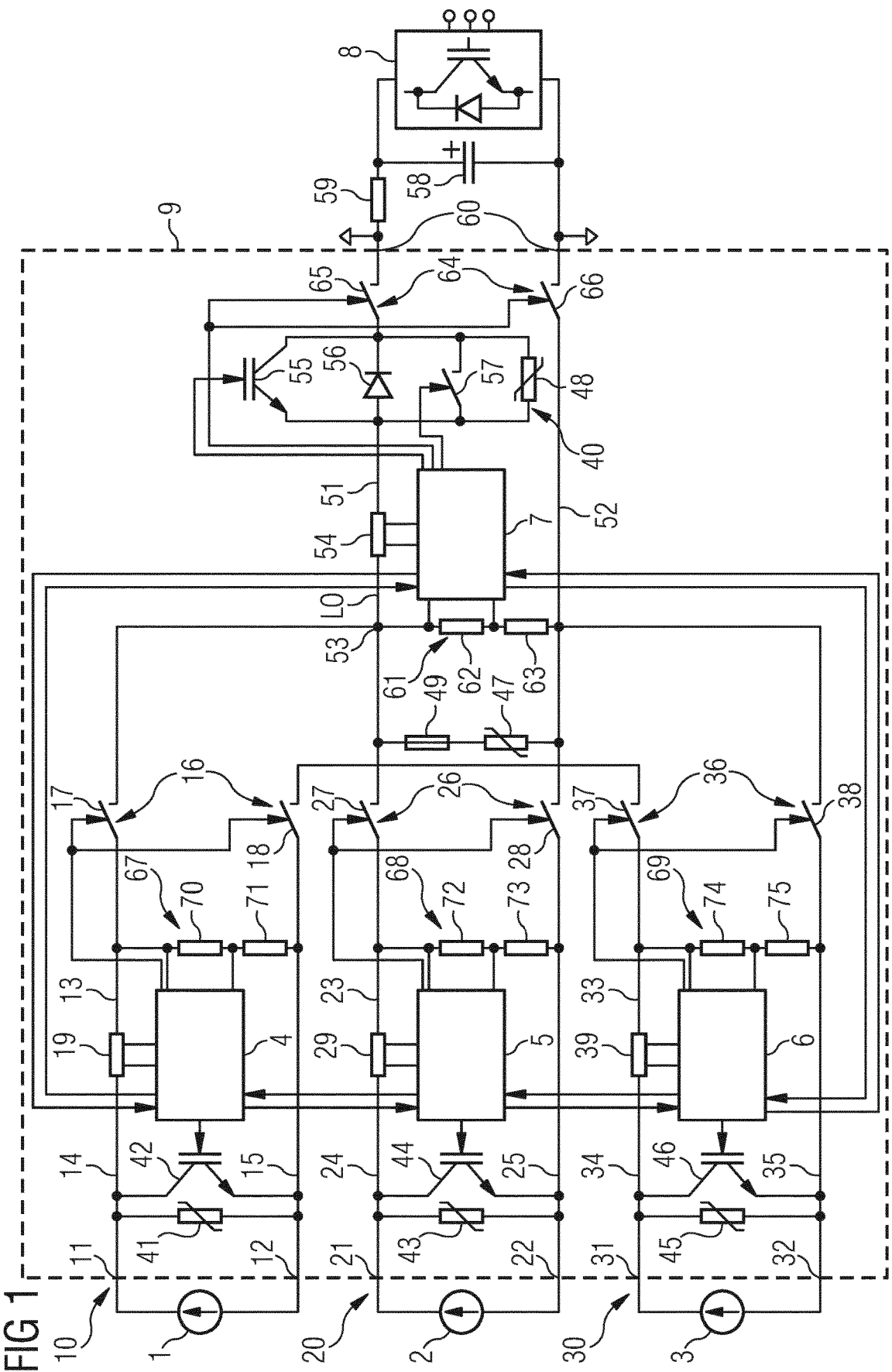
FIG. 1 shows a possible embodiment of a photovoltaic string combiner box with protection functions.

The PV string combiner box described herein is explained in greater detail below by way of exemplary embodiments with reference to the drawings. Elements which are the same in the individual figures are indicated with the same reference signs. The disclosure will be more fully understood from the following detailed description, taken in conjunction with the accompanying figures in which:

An exemplary embodiment of a photovoltaic string combiner box 9 with protection functions is shown in FIG. 1. The PV string combiner box comprises a plurality of input connections 10, 20, 30 to connect a plurality of photovoltaic strings 1, 2 and 3 to the combiner box 9. The PV string combiner box may be connected to a number of photovoltaic stings larger than 3. The PV string combiner box further comprises an output connection 60 to connect an inverter 8 to the combiner box 9. Furthermore, the photovoltaic string combiner box comprises a plurality of current lines 13, 23 and 33. A respective one of the current lines 13, 23 and 33 is connected to a respective one of the input connections 10, 20 and 30. The plurality of input connections 10, 20 and 30 respectively comprises a first input terminal 11, 21 and 31 as well as a second input terminal 12, 22 and 32.

The PV string combiner box 9 further comprises a plurality of controllable switches 42, 44 and 46 being connected to the plurality of input connections 10, 20 and 30 to short-circuit a respective one of the first and second input terminals 11, 12, 21, 22, and 31, 32. The PV string combiner box 9 comprises a plurality of disconnectors 16, 26 and 36 and a common current line 50 being connected to the output connection 60 and having an input node 53 being connected to each of the current lines 13, 23 and 33 by a respective one of the disconnectors 16, 26 and 36. The disconnector 16 comprises disconnector switches 17, 18, the disconnector 26 comprises disconnector switches 27, 28, and the disconnector 36 comprises disconnector switches 37 and 38.

As shown in FIG. 1, the PV string combiner box 9 comprises a controllable network 40 arranged in the common current line between the output connection 60 and the input node 53. The controllable network 40 is configured to provide a blocking of a current flowing from the output connection 60 to the disconnectors 16, 26, 36.

According to a possible embodiment of the PV string combiner box 9, the controllable network 40 comprises a bypass switch 57 being connected to the input node 53 and the output connection 60 to disconnect the input node 53 from the output connection 60. The controllable network 40 may further comprise a diode 56 being connected to the input node 53 and the output connection 60 and being further connected in parallel to the bypass switch 57. According to a possible embodiment, the controllable network 40 comprises a controllable switch 55 being connected to the input node 53 and the output connection 60 and being further connected in parallel to the bypass switch 57 and the diode 56. The controllable switch 55 may be an IGBT or a MOSFET. In case of using an IGBT, the diode 56 is a discrete component, whereas, when using a MOSFET, the diode 56 is realized by the monolithic parasitic diode of the MOSFET. The controllable network nay further comprise a varistor 48.

The PV string combiner box may further comprise a disconnector 64 being arranged in the common line 50 between the output connection 60 and the controllable network 40.

According to the embodiment of the PV string combiner box 9 shown in FIG. 1, each of the current lines 13, 23 and 33 comprises a first current path 14, 24, 34 and a second current path 15, 25 and 35. The respective first current path 14, 24 and 34 is connected to the respective first input terminal 11, 21, 31 and the respective second current path 15, 25 and 33 is connected to the respective second input terminal 21, 22 and 32.

The common current line 50 comprises a first common current path 51 and a second common current path 52. Each of the first current paths 14, 24 and 34 is connected to the first common current path 51 by a respective one of the disconnectors 16, 26 and 36. Furthermore, each of the second current paths 15, 25 and 35 is connected to the second common current path 52 by the respective one of the disconnectors 16, 26 and 36.

According to a possible embodiment of the PV string combiner box 9, a respective overvoltage protection device 41, 43 and 45 is connected to the input connection 10, 20 and 30, as shown in FIG. 1.

According to another possible embodiment, the PV string combiner box 9 comprises a plurality of first current detection devices 19, 29 and 39. Each of the first current detection devices 19, 29 and 39 is arranged in a respective one of the current lines 13, 23 and 33 between a respective one of the input connections 10, 20 and 30 and a respective one of the disconnectors 16, 26 and 36. The current detection devices 19, 29 and 39 may be embodied as a respective shunt.

According to the embodiment of the PV string combiner box shown in FIG. 1, the PV string combiner box comprises a plurality of first voltage detection devices 67, 68 and 69. A respective one of the first voltage detection devices 67, 68 and 69 is arranged between the respective first current path 14, 24, 34 and the respective second current path 15, 25 and 35 of a respective one of the current lines 13, 23 and 33.

According to a possible embodiment, the PV string combiner box 9 may further comprise a plurality of first controller devices 4, 5 and 6 to control a respective one of the disconnectors 16, 26 and 36. The first controller devices 4, 5 and 6 are respectively configured to evaluate a respective voltage drop at the plurality of the first voltage detection devices 67, 68 and 69. Moreover, the first controller devices 4, 5 and 6 are respectively configured to evaluate a respective current flowing through a respective one of the current lines 13, 23 and 33. The voltage detection devices 67, 68 and 69 may be embodied as a voltage divider.

According to a possible embodiment, the PV string combiner box 9 may comprise a second current detection device 54 being arranged in the common current line 50 between the output connection 60 and the input node 53. The second current detection device 54 may be embodied as a shunt. As shown in the exemplary embodiment of FIG. 1, the PV string combiner box 9 may comprise a second voltage detection device 61. The second voltage detection device 61 is arranged between the first common current path 51 and the second common current path 52 of the common current line 50. The voltage detection device 61 may be embodied as a voltage divider. The PV string combiner box may comprise a second controller device 7. The second controller device 7 is configured to evaluate a voltage drop at the second voltage detection device 61 and/or a current flowing through the second current detection device 54.

According to another embodiment of the PV string combiner box 9, the PV string combiner box may comprise a voltage surge protection device being arranged between the first common current path 51 and the second common current path 52.

The PV string combiner box 9 allows to protect and safely isolate each PV string 1, 2 and 3 of a PV array from the combiner box in a reliable manner. The operation of the PV string combiner box 9 for disconnecting and re-connecting a PV string to the combiner box is explained in the following by way of example for disconnecting/re-connecting the PV string 1 from/to the PV string combiner box.

The disconnection of a PV string, for example 1, is required for various reasons, such as maintenance of the string, while the other strings are generating current. First of all, the bypass switch 57, which may be configured as a bypass switch is driven to open its contact with quasi arc-free switching. The complete current which was flowing through the bypass switch 57 now flows through the diode 56 after a current commutation. Once the contact of the bypass switch 57 is open, the controllable switches 42, 44 and 46 which may respectively be configured as IGBTs, are turned on to short-circuit the strings. Due to the fact that the short-circuit current of a PV module is limited to around maximum 1.5 times of its maximum power point current ($I_{MPP}$), the intentional shorting of a PV string for a short time is acceptable.

The diode 56 blocks the reverse current flowing from a DC link capacitor bank 58 of a central PV inverter 8 or a DC-DC converter. Once the current flowing through the disconnector 16 which may be embodied as galvanic separation relays 17 and 18 is nearly zero, the disconnector 16, i.e. the relays 17 and 18, can open its contacts without arc. Therefore, the disconnector 16 can be AC-rated and does not have to be opened under current (no load disconnector function).

The described example of disconnecting the PV string 1 from the array/combiner box shows that the controllable switches 42, 44 and 46 as well as the controllable network 40 allows to provide a currentless operating, i.e. a currentless switching, of the disconnectors 16, 26 and 36.

Once the contacts of the disconnector 16 are open and mechanically stable, the controllable switches 42, 44 and 46 are turned off, i.e. conducted in a non-conductive state, and the bypass switch 57 is driven to close its contacts, respectively. The bypass switch 57 will reach a mechanically stable contact-position after some bouncing. During the bouncing, the current will be commutated back and forth between bypass switch 57 and the diode 56. The controllable (semiconductor) switch 55 which may be configured as an IGBT, can also be turned on, i.e. turned in a conductive state, during the bouncing due to the fact that the polarity of the arc voltage may change before the system reaches its steady-state conditions.

The total operation time will be around a few tenths of milliseconds considering conventional relays having 10 ms to 20 ms operation time.

The disconnection of one of the strings from the PV string combiner box 9 can be either done remotely or manually. In the case of manual disconnection, an auxiliary contact is installed within a disconnector to conduct the operation sequences listed above.

During the re-connection of the PV string 1, first of all the bypass switch 57 is driven to open its contacts so that the array current commutates to the diode 56. After the current commutation and contact opening, the controllable switches 42, 44 and 46 are driven to be turned on to short-circuit the PV strings. Finally, the disconnector 16, i.e. the controllable switches 17 and 18, can close the contacts without current and therefore without arc. Once the contacts of the disconnector 16 are mechanically stable, i.e. no bouncing occurs, the controllable switches 42, 44 and 46 are turned off, and the bypass switch 57 is driven to be turned on, respectively.

In addition, the connection can be done by means of a PWM signal without operation of the bypass switch 57 and shorting the strings 2 and 3. Before closing the contacts of the disconnector 16, i.e. the controllable switches 17 and 18, the controllable switch 42 is driven by a PWM signal to drive the voltage of the PV string 1 close to its open circuit voltage, where the current can be zero. By this, the potential difference between the array and the PV string 1 can be reduced so that by contact closing of disconnector 16, no significant amount of current may flow in the PV string 1 and no dramatic effect of the arc during the bouncing of the disconnector 16 occurs.

The voltage measurement of the PV array is done with the voltage detection device 61 that may be embodied as a voltage divider comprising the resistors 62 and 63. A fuse 49 and a varistor 47 may be connected in parallel to the resistors 62 and 63. The voltage measurement of the PV strings 1, 2, 3 is done by means of the respective voltage detection device 67, 67 and 69 that may be embodied as a voltage divider comprising the resistors 70 and 71, 72 and 73, and 74, 75.

The current measurement of each string and array is done by current detection devices 19, 29, 39 and 54 which can be embodied as a respective shunt. According to another possible embodiment, a Hall effect current transducer may be provided for the current measurement of each string and array.

According to an embodiment, the (smart) PV string combiner box 9 can include sub-microcontrollers which can communicate by means of communication lines, or one single microcontroller is used for all strings and arrays.

In the following, the operation of the PV string combiner box is explained by means of an example of connecting a PV array to a power conversion unit. The connection of the PV string combiner box (an array) to the power conversion unit may occur under following conditions: In the case of a single array, the DC link capacitor can be charged, and, in the case of multiple strings connected to the same DC link, the arrays may already be connected and drive current in the DC link.

Figure 2:
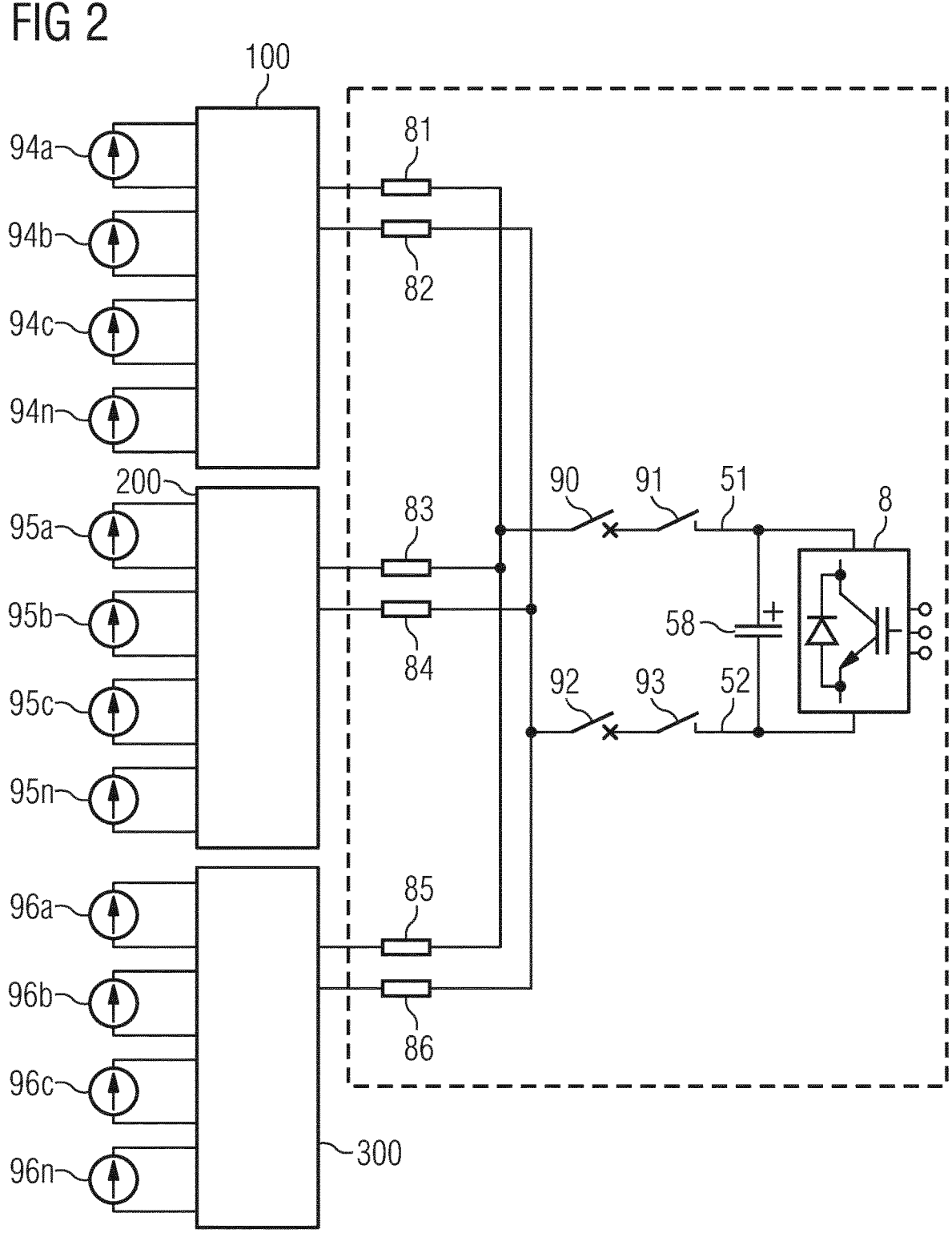
FIG. 2 illustrates an embodiment of multiple PV boxes/arrays.

FIG. 2 shows an example with three combiner boxes 100, 200 and 300 respectively connected to a plurality of PV strings. The combiner box 100 is coupled to the PV strings 94a, 94b, the combiner box 200 is coupled to the PV strings 95a, . . . , 95n, and the combiner box 300 is coupled to strings 96a, . . . , 96n. The combiner box 100 is disconnected while the PV arrays of the combiner boxes 200 and 300 are injecting current into the DC link. The combiner boxes 100, 200 and 300 are coupled via respective fuses 81, . . . , 86 to a first current path 51 comprising controllable switches 90, 91, and to a second current path 52 comprising controllable switches 92, 93. The operation proceeds with the following sequential steps, as described below.

First of all, the controllable switches 42, 44 and 46 are turned on at the same time to short-circuit the PV strings. After that, the disconnectors 16, 26 and 36 are driven to close their contacts. Now the disconnector 64, i.e. the controllable switches 65 and 66, can be closed without current. The diode 56 blocks any kind of reverse current flowing from the DC link to the strings. This is to say that the bouncing of the disconnector 64 occurs arc-free. Once the contacts of the disconnector 64 are mechanically stable, i.e. after bouncing, the controllable switches 42, 44 and 46 are turned off and the current flows to the DC link through the diode 56 and the disconnector 64. Shortly after the previous step, the bypass switch 57 is driven to close the contacts.

In the following, the operation of the PV string combiner box 9 under a faulted string is described. In the case of a line fault in a string, such as PV string 1, the current measurement with the current detection device 19, for example a shunt, will detect the fault. As soon as the fault is detected, the bypass switch 57 will be driven to open its contacts. During this time period, the controllable switch 55 is turned off and the controllable switches 42, 44 and 46 are turned on to short-circuit the PV strings. Once the current measured by the current detection device 19 is around a zero level, the disconnector 16 can now open the contacts. Once the contacts of the disconnector 16 are open, the controllable switches 42, 44 and 46 are turned off and the bypass switch 57 is driven to close its contacts, respectively. During the closing operation of the bypass switch 57, the controllable switch 55 can also be turned off in the case that, during the closing, the current flows from the DC link to the string side.

If the fault is in the string itself, i.e. before the controllable switch 42, the controller will inform the maintenance about the fault. Unless the fault is cleared, the string will not be reconnected to the array.

In low irradiance levels, the amount of the fault can be small. According to a possible embodiment, the PV string combiner box 9 may include a reference cell or a perimeter to be able to detect the fault current also at low irradiation levels. In particular, the combiner box can use both current and voltage of the PV strings to identify if there is a fault also at low irradiance levels.

The operation mode of the PV string combiner box 9 is further described under a faulty array. In the case of a line fault in the array, the controllable switches 42, 44 and 46 will be turned on and the bypass switch 57 is driven to open the contacts. The controllable switch 55 is also turned on due to the fact that the direction of the current is changed. As soon as the disconnectors 16, 26 and 36 are open, the controllable switches 42, 44 and 46 are turned off.

Due to the DC link capacitors 58, the fault current may be extra large. In this case, a fuse 59 may be blown up to protect the DC link. In the case of ultra-fast bypass contact opening and cabling between the combiner box 9 and the inverter 8, the fuse 59 may not open. An additional inductance can also be added to the circuit to buy time for the bypass relay.

Another example for the operation of the PV string combiner box is the arc-fault detection of the disconnectors 16, 26 and 36. The voltage measurements on each string can be compared with each other and the array voltage. In the case of non-shaded strings, the voltage measurements will be identical. With the voltage measurements in front and behind the disconnectors 16, 26 and 36, for example the galvanic separation relays, the health status of any relay can be monitored. For example, if the contacts of the disconnector 16 are not really closed or contact closing pressure is decreased with aging, the voltage drop on the disconnector will increase. The controller device can detect this abnormal state by comparison of the voltages and may inform a user or disconnect the faulty string from the rest of the array.

As another example, the PV string combiner box 9 may detect a DC series arc fault with current measurement. Frequency domain analysis can be used to detect a DC series arc fault. In particular, AC current noises during the DC series arc can be used to detect an arc in the string.

The PV string combiner box 9 may further be used for detection of a ground fault. Ground fault detection of an undergrounded inverter can be implemented on each string instead of only on the complete array by an RCD (residual current detection) function.

The invention described herein is not restricted by the description given with reference to the exemplary embodiments. Rather, the invention encompasses any novel feature and any combination of features, including in particular any combination of features in the claims, even if this feature or this combination is not itself explicitly indicated in the claims or exemplary embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A photovoltaic string combiner box with protection functions, comprising:
    a plurality of input connections configured to connect a plurality of photovoltaic strings to the combiner box, the plurality of input connections respectively comprising a first input terminal and a second input terminal;
    an output connection configured to connect an inverter to the combiner box;
    a plurality of current lines, a respective one of the current lines being connected to a respective one of the input connections;
    a plurality of controllable switches being connected to the plurality of input connections to short-circuit a respective one of the first and second input terminals;
    a plurality of disconnectors;
    a common current line connected to the output connection and having an input node connected to each of the plurality of current lines by a respective one of the disconnectors; and
    a controllable network arranged in the common current line between the output connection and the input node, the controllable network being configured to provide a blocking of a current flowing from the output connection to the plurality of disconnectors,
    wherein the controllable network comprises a bypass switch connected to the input node and the output connection to disconnect the input node from the output connection, and
    wherein the controllable network comprises a diode connected to the input node and the output connection and further connected in parallel to the bypass switch.

2. The photovoltaic string combiner box of claim 1, wherein the controllable network comprises a second controllable switch connected to the input node and the output connection and further connected in parallel to the bypass switch and the diode.

3. The photovoltaic string combiner box of claim 1, further comprising:
    a second disconnector being arranged in the common line between the output connection and the controllable network.

4. The photovoltaic string combiner box of claim 1, wherein each of the plurality of current lines comprises a first current path and a second current path,
    wherein a respective first current path is connected to a respective first input terminal and a respective second current path is connected to a respective second input terminal,
    wherein the common current line comprises a first common current path and a second common current path,
    wherein each of the first current paths is connected to the first common current path by a respective one of the plurality of disconnectors, and wherein each of the second current paths is connected to the second common current path by the respective one of the plurality of disconnectors.

5. The photovoltaic string combiner box of claim 1, further comprising:
a plurality of first current detection devices,
wherein each of the plurality of first current detection devices is arranged in a respective one of the current lines between a respective one of the input connections and a respective one of the disconnectors.

6. The photovoltaic string combiner box of claim 5, further comprising:
a plurality of first voltage detection devices,
wherein a respective one of the plurality of first voltage detection devices is arranged between the first current path and the second current path of a respective one of the current lines.

7. The photovoltaic string combiner box of claim 6, further comprising:
a plurality of first controller devices configure to control a respective one of the plurality of disconnectors,
wherein the plurality of first controller devices are respectively configured to evaluate a respective voltage drop at the plurality of the first voltage detection devices, and
wherein the plurality of first controller devices are respectively configured to evaluate a respective current flowing through a respective one of the plurality of current lines.

8. The photovoltaic string combiner box of claim 6, further comprising:
a second current detection device arranged in the common current line between the output connection and the input node.

9. The photovoltaic string combiner box of claim 8, further comprising:
a second voltage detection device,
wherein the second voltage detection device is arranged between the first common current path and the second common current path of the common current line.

10. The photovoltaic string combiner box of claim 9, further comprising:
a second controller device,
wherein the second controller device is configured to evaluate a voltage drop at the second voltage detection device and/or a current flowing through the second current detection device.

11. A photovoltaic string combiner box with protection functions, comprising:
a plurality of input connections configured to connect a plurality of photovoltaic strings to the combiner box, the plurality of input connections respectively comprising a first input terminal and a second input terminal;
an output connection configured to connect an inverter to the combiner box;
a plurality of current lines, a respective one of the current lines being connected to a respective one of the input connections;
a plurality of controllable switches being connected to the plurality of input connections to short-circuit a respective one of the first and second input terminals;
a plurality of disconnectors;
a common current line connected to the output connection and having an input node connected to each of the plurality of current lines by a respective one of the disconnectors;
a controllable network arranged in the common current line between the output connection and the input node, the controllable network being configured to provide a blocking of a current flowing from the output connection to the plurality of disconnectors; and
a second disconnector being arranged in the common line between the output connection and the controllable network.

12. A photovoltaic string combiner box with protection functions, comprising:
a plurality of input connections configured to connect a plurality of photovoltaic strings to the combiner box, the plurality of input connections respectively comprising a first input terminal and a second input terminal;
an output connection configured to connect an inverter to the combiner box;
a plurality of current lines, a respective one of the current lines being connected to a respective one of the input connections;
a plurality of controllable switches being connected to the plurality of input connections to short-circuit a respective one of the first and second input terminals;
a plurality of disconnectors;
a common current line connected to the output connection and having an input node connected to each of the plurality of current lines by a respective one of the disconnectors;
a controllable network arranged in the common current line between the output connection and the input node, the controllable network being configured to provide a blocking of a current flowing from the output connection to the plurality of disconnectors;
a plurality of first current detection devices; and
a plurality of first voltage detection devices,
wherein each of the plurality of first current detection devices is arranged in a respective one of the current lines between a respective one of the input connections and a respective one of the disconnectors, and
wherein a respective one of the plurality of first voltage detection devices is arranged between the first current path and the second current path of a respective one of the current lines.

13. The photovoltaic string combiner box of claim 12, further comprising:
a plurality of first controller devices configure to control a respective one of the plurality of disconnectors,
wherein the plurality of first controller devices are respectively configured to evaluate a respective voltage drop at the plurality of the first voltage detection devices, and
wherein the plurality of first controller devices are respectively configured to evaluate a respective current flowing through a respective one of the plurality of current lines.

14. The photovoltaic string combiner box of claim 12, further comprising:
a second current detection device arranged in the common current line between the output connection and the input node.

15. The photovoltaic string combiner box of claim 14, further comprising:
a second voltage detection device,
wherein the second voltage detection device is arranged between the first common current path and the second common current path of the common current line.

16. The photovoltaic string combiner box of claim 15, further comprising:

a second controller device,
wherein the second controller device is configured to evaluate a voltage drop at the second voltage detection device and/or a current flowing through the second current detection device.

\* \* \* \* \*